(12) United States Patent
Singh et al.

(10) Patent No.: US 11,159,772 B2
(45) Date of Patent: Oct. 26, 2021

(54) ELECTRONIC DOORBELL SYSTEM WITH CAMERA SELECTION

(71) Applicant: Arlo Technologies, Inc., Carlsbad, CA (US)

(72) Inventors: Rajinder Singh, San Jose, CA (US); Justin Maggard, Fremont, CA (US); Dnyanesh Patil, Fremont, CA (US); Dennis Aldover, Carlsbad, CA (US); Nisheeth Gupta, Mountain View, CA (US)

(73) Assignee: Arlo Technologies, Inc., Carlsbad, CA (US)

( * ) Notice: Subject to any disclaimer, the term of this patent is extended or adjusted under 35 U.S.C. 154(b) by 0 days.

(21) Appl. No.: 16/289,183

(22) Filed: Feb. 28, 2019

(65) Prior Publication Data
US 2020/0280702 A1 Sep. 3, 2020

(51) Int. Cl.
| | | |
|---|---|---|
| H04N 21/43 | (2011.01) | |
| H04N 7/18 | (2006.01) | |
| G08B 13/19 | (2006.01) | |
| G08B 3/10 | (2006.01) | |
| G06N 3/04 | (2006.01) | |

(52) U.S. Cl.
CPC ............ H04N 7/186 (2013.01); G06N 3/04 (2013.01); G08B 3/1016 (2013.01); G08B 13/19 (2013.01); H04N 7/181 (2013.01); H04N 21/4307 (2013.01)

(58) Field of Classification Search
CPC .... H04N 7/186; H04N 7/181; H04N 21/4307; G06N 3/04; G08B 3/1016; G08B 13/19

USPC ........................................................ 348/155
See application file for complete search history.

(56) References Cited

U.S. PATENT DOCUMENTS

| | | | |
|---|---|---|---|
| 5,428,388 | A | 6/1995 | vonBauer |
| 5,729,471 | A | 3/1998 | Jain et al. |
| 6,970,576 | B1 | 11/2005 | Tilsley |
| 8,682,034 | B2 | 3/2014 | Garoutte |
| 9,179,109 | B1 | 11/2015 | Kasmir et al. |

(Continued)

FOREIGN PATENT DOCUMENTS

| | | | | |
|---|---|---|---|---|
| GB | 2397726 A | * | 12/2003 | |
| GB | 2397726 A | * | 7/2004 | ............ H04N 7/185 |
| WO | 2016114932 A1 | | 7/2016 | |

*Primary Examiner* — Zaihan Jiang
(74) *Attorney, Agent, or Firm* — Boyle Fredrickson, SC

(57) ABSTRACT

An electronic doorbell system can be configured to allow simultaneous video and audio communication to a user on a computing device in which the video is provided by a camera that is selected from among multiple available cameras provided at different locations, while the audio is provided by a microphone of the doorbell system such as a microphone associated with the doorbell or a selected camera. User input can allow selection of one or more cameras. When multiple cameras are selected, the system can take an audio/video feed from the cameras in predetermined sequence or random sequence based on events observed by the system The camera could be selected by default, based on user input, and/or automatically using artificial intelligence. Selection by artificial intelligence could comprise, for example, selecting a camera based on a detected motion and/or sound, a captured image matching a predetermined image and/or a captured sound matching a predetermined sound.

20 Claims, 9 Drawing Sheets

(56) References Cited

U.S. PATENT DOCUMENTS

| | | | |
|---|---|---|---|
| 9,635,323 B2 | 4/2017 | Carter | |
| 9,706,178 B2 | 7/2017 | Carter | |
| 2003/0081120 A1* | 5/2003 | Klindworth | G08B 13/19693 348/143 |
| 2004/0132489 A1* | 7/2004 | Ryley | H04N 7/186 455/556.1 |
| 2010/0195810 A1 | 8/2010 | Mota et al. | |
| 2011/0292161 A1* | 12/2011 | Sharon | H04N 19/89 348/14.07 |
| 2013/0315404 A1* | 11/2013 | Goldfeder | H04R 3/005 381/58 |
| 2014/0009609 A1* | 1/2014 | Webster | H04N 7/186 348/143 |
| 2015/0085121 A1* | 3/2015 | Englander | H04N 7/183 348/148 |
| 2016/0014321 A1* | 1/2016 | Feltham | H04N 5/772 348/159 |
| 2016/0044226 A1* | 2/2016 | Williams | H04N 7/181 348/211.3 |
| 2016/0088287 A1* | 3/2016 | Sadi | H04N 13/261 348/43 |
| 2016/0330403 A1* | 11/2016 | Siminoff | H04N 5/2257 |
| 2016/0330413 A1 | 11/2016 | Scalisi et al. | |
| 2016/0337243 A1* | 11/2016 | Cui | H04W 76/14 |
| 2017/0171516 A1 | 6/2017 | Modestine et al. | |
| 2017/0187995 A1* | 6/2017 | Scalisi | G08B 13/1472 |
| 2017/0251182 A1* | 8/2017 | Siminoff | G08B 25/08 |
| 2018/0004747 A1* | 1/2018 | Smith | H04N 7/186 |
| 2018/0047269 A1 | 2/2018 | Thomas et al. | |
| 2018/0233010 A1 | 8/2018 | Modestine et al. | |
| 2018/0307903 A1* | 10/2018 | Siminoff | G06K 9/00369 |
| 2018/0341835 A1* | 11/2018 | Siminoff | G06F 16/434 |
| 2018/0342329 A1* | 11/2018 | Rufo | H04L 12/2812 |
| 2018/0357870 A1* | 12/2018 | Siminoff | G08B 13/19606 |
| 2019/0007656 A1* | 1/2019 | Levi | H04N 7/181 |
| 2019/0260488 A1* | 8/2019 | Emmanuel | H04B 17/0085 |

* cited by examiner

ELECTRONIC DOORBELL SYSTEM WITH CAMERA SELECTION

BACKGROUND OF THE INVENTION

1. Field of the Invention

The present invention relates to an electronic monitoring system, and more particularly, to an electronic doorbell system being configured to communicate with a user.

2. Discussion of the Related Art

A doorbell is a signaling device typically placed near a door to a building's entrance. When a visitor presses a button, the bell rings or otherwise generates a human discernable signal inside the building, alerting the occupant to the presence of the visitor. Although the first doorbells were mechanical, activated by pulling a cord, modern doorbells are generally electric switches; and the most recent versions may contain miniature cameras, may be connected to the Internet, and may even incorporate facial recognition technology. These doorbells permit a user to monitor doorbell activation remotely via an application user-accessible device such as a computer or smartphone.

However, modern doorbells continue to suffer from several drawbacks. For example, while such doorbells can contain a camera, the camera typically fails to provide an optimum viewing angle due to the placement of the doorbell itself being in a traditional mid-height location near the door. Nor can the viewing angle of the typical doorbell camera be altered in any way. Nor can a camera connected to the doorbell be switched to a different camera.

A need therefore exists for an improved doorbell system which eliminates one or more of the foregoing disadvantages.

SUMMARY OF THE INVENTION

An electronic doorbell system can be configured to allow simultaneous video and audio communication to a user on a computing device in which the video is provided by a camera that is selected from among multiple available cameras provided at different locations, while the audio is provided by a microphone of the doorbell system, such as a microphone associated with the doorbell or a selected camera. User input can allow selection of one or more cameras. When multiple cameras are selected, the system can take an audio/video feed from the cameras in predetermined sequence or random sequence based on events observed by the system. In one aspect, audio can be streamed from the microphone of another camera in the system, while audio form the doorbell is recorded to be played back later or immediately after the audio from camera is stopped. The camera could be selected by default, based on user input, and/or automatically using artificial intelligence. Selection by artificial intelligence could comprise, for example, selecting a camera based on a detected motion and/or sound, a captured image matching a predetermined image and/or a captured sound matching a predetermined sound. The doorbell system can communicate the video and audio to the user as a synchronized media stream. such as during a Voice over Internet Protocol (VoIP) call, and the source of the video and/or audio can be dynamically switched mid-stream, during the VoIP call, upon selection of alternate camera.

Specifically then, one aspect of the present invention can provide an electronic doorbell system, including: an electronic doorbell configured to capture an audio stream; at least two cameras, each camera being configured to capture a video and/or audio stream; and a hub in communication with the electronic doorbell and the cameras, the hub having a processor. The processor is configured to execute a program stored in a non-transient medium operable to select a camera from the multiple cameras for capturing a video stream, and synchronize the video stream from the selected camera with the audio stream from the electronic doorbell to produce a synchronized media stream.

Another aspect of the present invention can provide a method for electronic monitoring, including: configuring an electronic doorbell to capture an audio stream; configuring multiple cameras to each capture a video and/or audio stream; selecting a camera from the multiple cameras for capturing a video stream; and synchronizing the video stream from the selected camera with the audio stream from the electronic doorbell to produce a synchronized media stream.

These and other objects, advantages and aspects of the invention will become apparent from the following description. The particular objects and advantages described herein can apply to only some embodiments falling within the claims and thus do not define the scope of the invention. In the description, reference is made to the accompanying drawings which form a part hereof, and in which there is shown a preferred embodiment of the invention. Such embodiment does not necessarily represent the full scope of the invention and reference is made, therefore, to the claims herein for interpreting the scope of the invention.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION OF THE PREFERRED EMBODIMENTS

Figure 1:
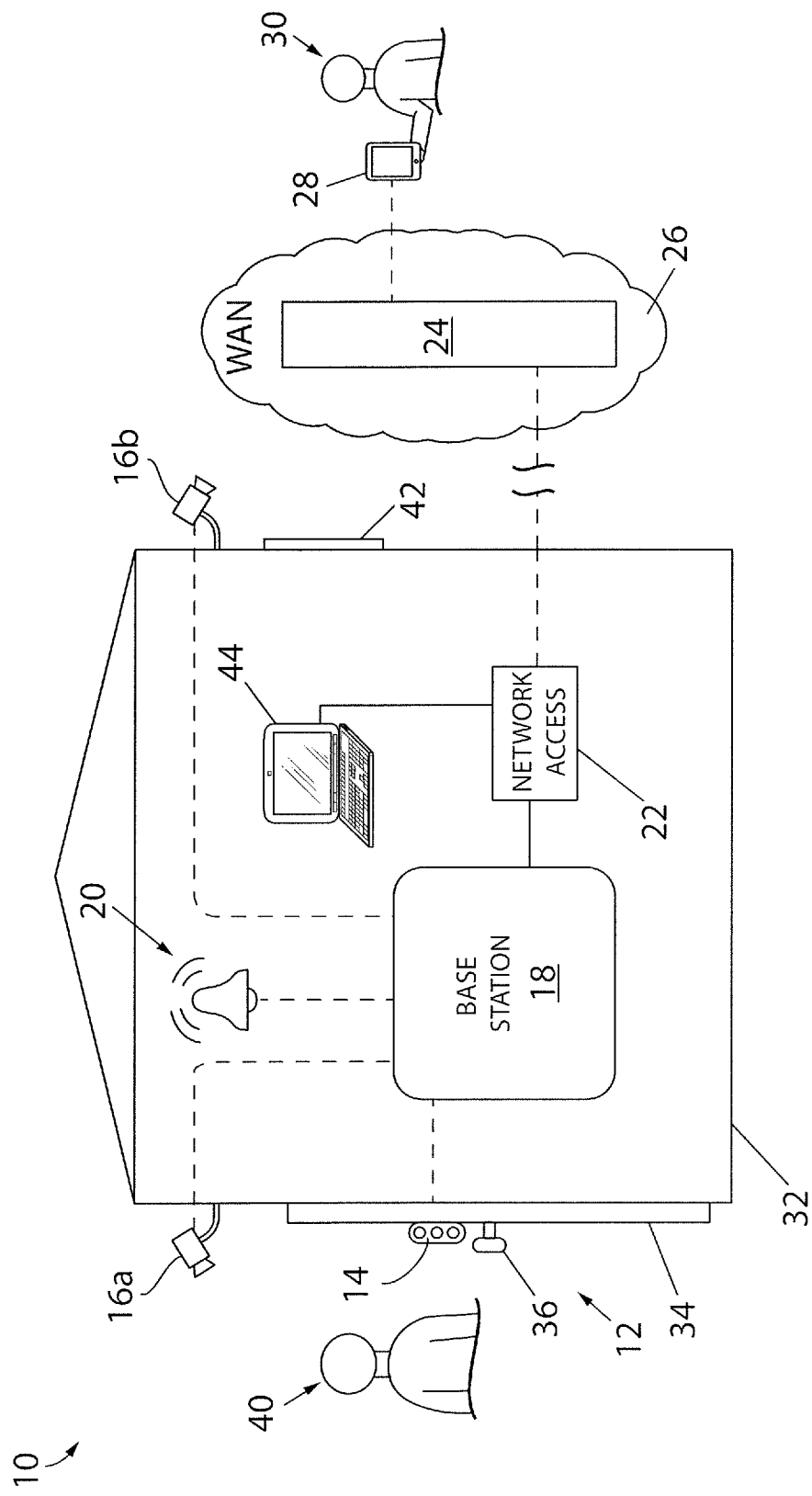
FIG. 1 is a diagram of a system for electronic monitoring which uses an electronic doorbell, two or more cameras, and base station in accordance with an aspect of the invention.

Referring now to FIG. 1, a diagram illustrating a system 10 for electronic monitoring is provided in accordance with an aspect of the invention. The system 10 can comprise an electronic doorbell system 12, including an electronic doorbell 14, two or more cameras 16, such as first and second cameras 16a and 16b, respectively, a hub or base station 18, and/or a chime 20. The base station 18 can communicate with the doorbell 14, the cameras 16 and/or the chime 20 through a wireless local network, such as an IEEE 802.11 wireless Local Area Network (LAN). The base station 18, in turn, can connect to network access equipment 22, such as modem and/or router, for communicating with a backend system 24 through a Wide Area Network (WAN) 26 such as the Internet. The backend system 24, which could comprise one or more servers, in turn, can communicate with an electronic device 28, such a smart phone, tablet computer, or laptop or desktop computer operated by a user 30.

The doorbell system 12 can be arranged with respect to a building 32, such as a home or office building. For example, the doorbell 14 can be arranged proximal to a door 34 of the building 32. This location may, for example, be in a traditional location customarily found by visitors, such as against an exterior wall or doorframe of the building 32 adjacent to the door 34 at a height just above a door knob 36. Each camera 16 can also be arranged with respect to a building 32, but advantageously at separate locations from the doorbell 14 to provide optimum viewing angles of visitor(s). For example, a first camera 16a can be arranged against the exterior wall of the building 32, several feet above the door 34, to provide an optimum angle for viewing a visitor 40 standing in front of the door. Also, a second camera 16b can be arranged against a different area of the building 32, such as several feet above a side or back window 42, distal from the first camera 16a, to provide an optimum angle for viewing any person proximal to such alternative access point. "Distal" refers to a physical separation between devices such that views and/or sounds captured by the devices far enough away from one another such that the devices are operable provide distinctly different points of observation that are useful to the user 30. As yet another example, a camera (not shown) could be mounted on a post or tree located several feet away from the building with a view of the door 34.

In addition, in one aspect, a computer 44 can be connected directly to the system, such as through the network access equipment 22, for allowing a user in the building 32 direct access to the doorbell system 12 like the device 28. The computer 44 could, for example, comprise a tablet, laptop, or desktop computer. This can serve as a back-up to the device 28 when the user 30 is in the building 32 for communicating over the VoIP telephone call with the visitor 40 as described herein.

A visitor 40 approaching the door 34 can cause a trigger event. Such trigger events could comprise, for example: the visitor 40 pressing or otherwise actuating a button on the doorbell 14; motion of the visitor 40 being detected by a motion sensor of the doorbell 14 and/or in a floodlight, a camera, or other device located in the vicinity of the doorbell and in communication with thee base station 18; and/or a sound of the visitor 40 being detected by a microphone of the doorbell 14. Following occurrence of the trigger event, the system 12 is configured to immediately call the user 30 via the device 28. In the most typical case in which the call is an audio form, possibly accompanied by video data, enabled by the base station 18 making a Voice over Internet Protocol (VoIP) call to the device 28. The system 12 may reduce latency by omitting push notifications to the device 28, which otherwise would require the user 30 to open an application program on the device 28 before making any calls. In this case, the system proceeds to immediately call the user's device. The remainder of the specific example contained herein assumes such a telephone call.

In one aspect, an audio stream captured by a microphone of the doorbell 14, and a video stream captured by a camera 16, such as the first camera 16a, can be synchronized by the base station 18 to communicate a synchronized media stream in near real time to the device 28. "Near real time" refers to the time delay introduced, by automated data processing and/or network transmission, between the occurrence of an event and the use of the processed data, such as for display or feedback and control purposes. For example, a near real time display depicts an event or situation as it existed at the current time minus the processing time, as nearly the time of the live event. Also, an audio stream captured by a microphone of the device 28 can be returned to the base station 18 to communicate to the doorbell 14 to allow a near real time VoIP conversation between the user 30 and the visitor 40 during a call.

Figure 2:
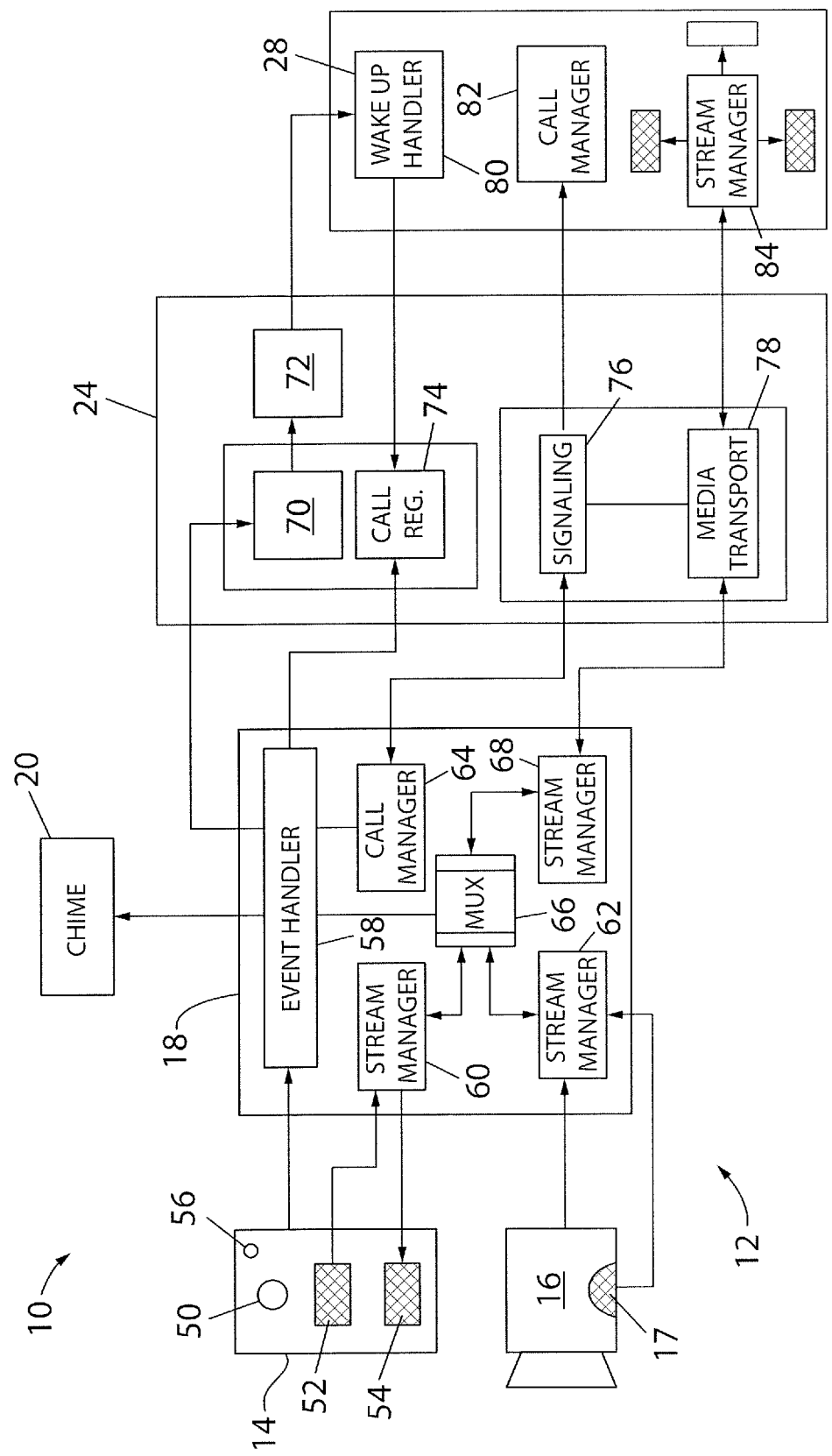
FIG. 2 is a diagram illustrating communication in the system of FIG. 1.

Referring now to FIG. 2, a diagram illustrating communication in the system 10 is provided in accordance with an aspect of the invention. The doorbell 14 can include a button 50, a built-in camera 51, a microphone 52, a speaker 54 and/or a motion sensor 56. As mentioned, some of these functionalities could be provided on or duplicated on devices located apart from the doorbell. The doorbell 14 can also include processing and circuitry contained in a doorbell housing configured to be arranged proximal to the door 34. The button 50 can be a doorbell button or switch that is sensed by the base station 18 when actuated by the visitor 40. The microphone 52 can be configured to capture an incoming audio stream for communication in the system and for detection of sound (such as the voice of visitor 40). The speaker 54 can be configured to play an outgoing audio stream for communication to the visitor 40. The motion sensor 56 could be an active or passive Infrared (IR) motion sensor for detection of motion (such as by the visitor 40).

The camera 16 can include a lens, a microphone, a speaker and/or a motion sensor. The camera 16 can also include processing and circuitry contained in a camera housing configured to be arranged in diverse locations, such as against an exterior wall of the building 32 or even apart from but facing the building. The camera 16 can be configured to capture a video stream for communication in the system. The camera 16 can also be configured for detection of motion (such as from the visitor 40).

Figure 3:
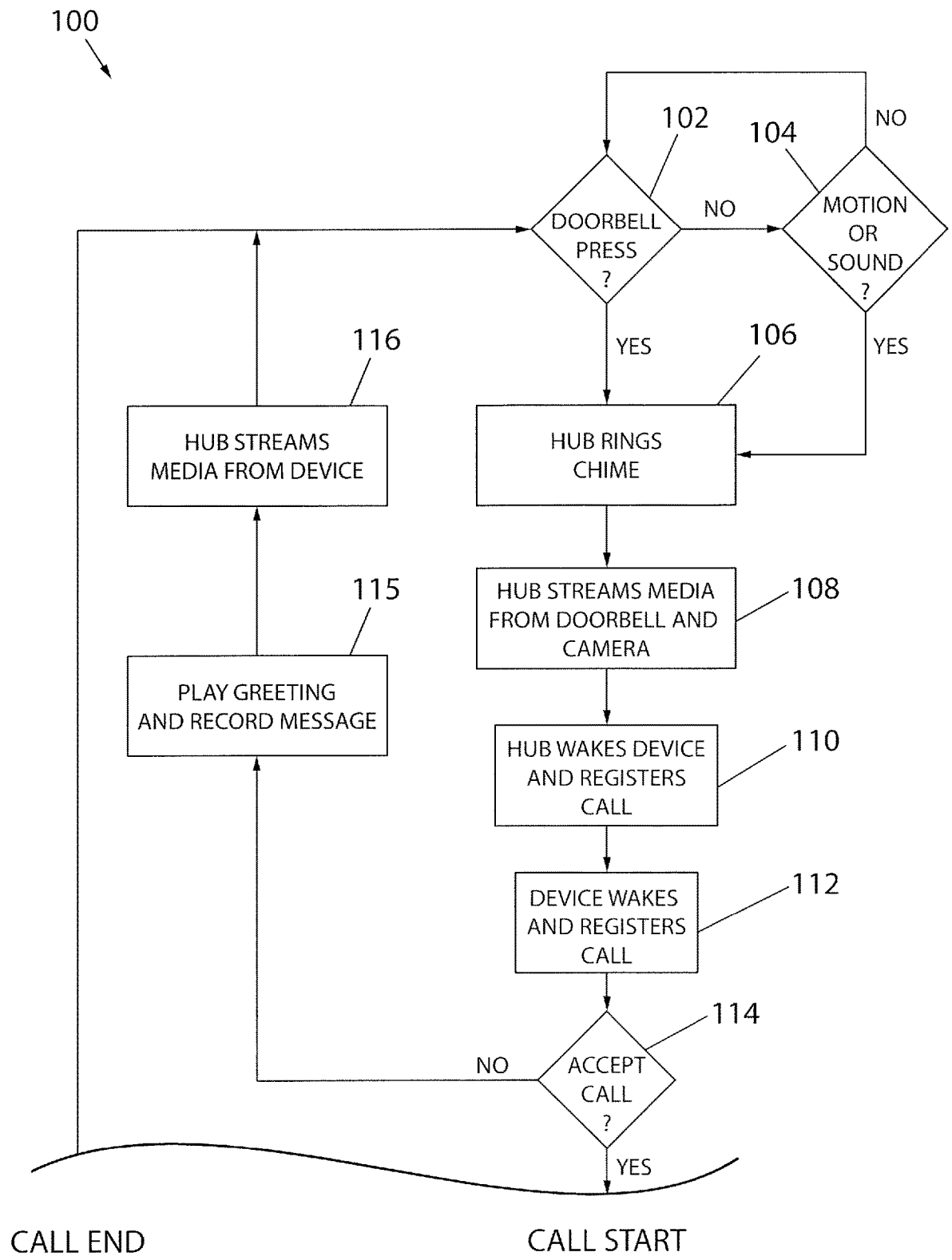
FIG. 3 is a flow chart illustrating operation for an electronic device receiving a call in the system of FIG. 1.

With additional reference to a process 100 of FIG. 3 and continued reference to the system schematic of FIG. 2, an operation for a VoIP telephone call to the device 28, triggered by the system 12, is provided in accordance with an aspect of the invention. Beginning at decision steps 102 and 104, the system 12 can monitor for a trigger event near the doorbell continuously in a loop. For example, at decision step 102, the base station 18 can monitor the button 50 of the doorbell 14 for actuation by a visitor 40. If the button 50 is not actuated or pressed ("No"), the base station 18 can proceed to decision step 104 to monitor for another triggering event such as the detection of motion and/or sound near the doorbell, such as motion detected by the motion sensor 56, sound detected by the microphone 52, and/or motion or sound detected by the camera 16. If another trigger event is not detected ("No"), the base station 18 can return to decision step 102 in a loop. However, if the button 50 is actuated or pressed at decision step 102 ("Yes"), and/or if another trigger event such as motion and/or sound is detected at decision step 104 ("Yes"), the process 100 can break the monitoring loop and proceed to step 106. Such trigger events can be detected by an event handler 58 of the base station 18.

Next, in response to the trigger event, the system 12 can proceed to take any or all of several actions near simultaneously. At step 106, the base station 18 can control the chime 20 to ring in the building 32, causing an audible alarm to alert occupants of the building 32 of the presence by the visitor 40. At step 108, the base station 18 can stream audio captured by the doorbell 14 and video captured by the camera 16 (it being understood that the camera may be any of several cameras 16*a*, 16*b*, etc. that are active at that time). In particular, an audio stream manager 60 of the base station 18 can capture the audio stream from the doorbell 14, and a video stream manager 62 of the base station 18 can capture the video stream from the camera 16, along with an audio stream from a microphone 17 of the camera 16, if the camera 16 is so equipped. A multiplexor 66 of the base station 18 can synchronize the audio stream from the audio stream manager 60 with the video stream from the video stream manager 62 for later communicating a synchronized media stream to the device 28 after communication has been established.

At step 110, the base station 18 can proceed to wake the device 28 for the call. In the case of the call being a telephone call, the base station 18 can register itself for the VoIP call, through the backend system 24. In particular, the base station 18 can wake the device 28 for the telephone call by the event handler 58 contacting a system events service 70 of the backend system 24. The event handler 58 can request, through the system events service 70, an endpoint for making the call. The system events service 70, in turn, can send a wake-up notification to a notify service 72. The notify service 72, in turn, can send the wake-up notification to a wake-up handler 80 executing on the device 28. Also, the base station 18 can register for the call through the backend system 24 by the event handler 58 contacting a call registration service 74.

At step 112, the device 28 can wake via the wake-up handler 80. Also, the device 28 can register to receive the VoIP call through the backend system 24. With the call registered at each endpoint, a call manager 64 of the base station 18 can send a call invite to the device 28 through a signaling service 76. The signaling service 76 can provide Session Initiation Protocol (SIP) signaling for initiating, maintaining, and terminating real-time sessions that include voice, video and messaging applications between the system 12 and the device 28. A call manager 82 of the device 28, in turn, can receive the invitation. This can appear to the user 30 as the device 28 spontaneously waking and ringing with an immediate incoming phone call with a caller identification (Caller ID) indicating the system 12 as being the caller.

At decision step 114, the user 30 can choose to accept or decline the call, such as by tapping an appropriate selection on a touchscreen of the device 28, like other incoming phone calls. If the user chooses to decline the call ("No"), the process 100 can proceed to step 115 in which the base station 18, being operable to detect a failure of the electronic device to answer the call, controls the doorbell 14 to play a predetermined greeting and record a voice message with a defined start and stop from the visitor 40 in response to the greeting. For example, the doorbell 14 may relay "I cannot come to the door right now." The voice message, in turn, can be sent by the base station 18 to device 28. In other words, if at decision step 114 the user declines the call ("No"), then a SIP call is not initiated between the doorbell 14 (through the base station 18) and the device 28. Instead, a prerecorded audio message can be played at the doorbell 14, such as: "We are not able to come to the door right now. Please leave a message."

In addition, in the process 100, at step 116, a loaded application program executing on the device 28 can receive the synchronized media stream to the device 28. In particular, a hub stream manager 68 of the base station 18 can send the synchronized media stream from the multiplexor 66 ("mux") to a media transport tunneling service 78 of the backend system 24. The media transport tunneling service 78 can provide Real Time Streaming Protocol (RTSP) signaling to control the media stream as Real-time Transport Protocol (RTP) packets between the base station 18 and the device 28. An application stream manager 84 of the device 28, executing as part of the application program, can receive the media stream. The user 30 can open the application program on the device 28 to see and hear the media stream in real time through the application program. Alternatively, the user 30 can place the device 28 back into sleep with the possibility of returning to the application program later for viewing the media stream as a recorded event.

Figure 4:
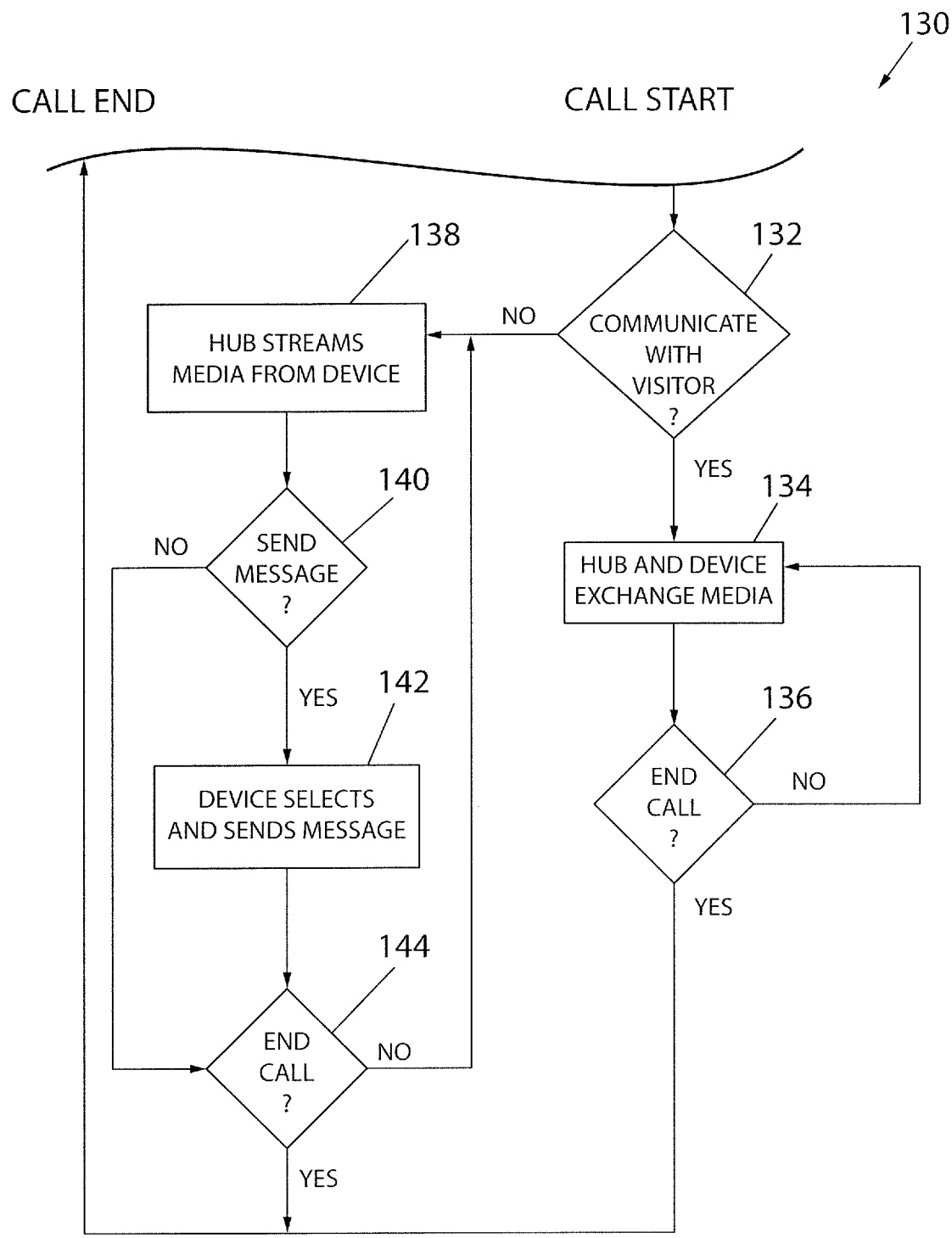
FIG. 4 is a flow chart illustrating operation for an electronic device communicating with the doorbell during a call in the system of FIG. 1.

However, returning to decision step 114, and with additional reference to FIG. 4, if the user chooses to accept the call ("Yes"), the process 100 can proceed to a telephone call routine ("Call Start") at process 130. In other words, if at decision step 114 the user accepts the call ("Yes"), then a SIP call is initiated between the doorbell 14 (through the base station 18) and the device 28. By default, the microphone of the device 28 can be muted. At decision step 132, after accepting the call, the user 30 can choose whether to communicate directly or indirectly with the visitor 40, such as by tapping another selection on the touchscreen of the device 28. If the user chooses to communicate directly with the visitor ("Yes"), such as for a more traditional phone call, the process 130 can proceed to step 134 in which the microphone of the device 28 is unmuted, and the base station 18 and the device 28 exchange bi-directional media streams in a VoIP call that is near real time. In one aspect, the exchange of bi-directional media streams can comprise outgoing video and audio streams from the system 12 (and the doorbell 18) to the device 28, and only an incoming audio stream from the device 28 to the system 12. However, in another aspect, the doorbell 14 can be configured with a display, and the exchange of bi-directional media streams can comprise outgoing video and audio streams from the system 12 (and the doorbell 18) to the device 28, and incoming video and audio streams from the device 28 to the system 12. The process can then proceed to decision step 136 in which the user 30 can choose to end the call at any time. If the user 30 does not end the call ("No"), the process can return to step 134 in which the base station 18 and the device 28 continue to exchange bi-directional media streams. In other words, the SIP session stays active until the user 30 ends the call via the device 28. However, if the user 30 does end the call ("Yes"), the process can return to the process 100 of FIG. 3 ("Call End"), returning to decision steps 102 and 104, monitoring for another trigger event.

However, returning to decision step 132 of FIG. 4 as well as the system diagram of FIG. 2, after accepting the call, the user 30 can also choose to communicate indirectly with the visitor 40. If the user 30 chooses to communicate indirectly with the visitor 40 ("No"), the process 130 can proceed instead to step 138 in which the microphone of the device 28 continues to be muted, and the device 28 proceeds to receive the synchronized media stream from the base station 18. Despite inhibiting audio from the device 28, the user 30 of the device 28 can still listen/view the media stream from the doorbell 14. In addition, at decision step 140, the user 30 can at any time decide whether to send a message to play at the doorbell 14. The user 30 can type or dictate a custom message, and/or select any of multiple predetermined messages, including messages pre-recorded by the user 30 and/or "stock" messages selectable by the user from a pre-programmed list, for playing to the speaker 54 of the doorbell 14. One exemplar message could be: "Please leave your package by the door." Another exemplar message could be: "Sorry I cannot come to the door right now. Please contact me later." If the user 30 decides to send a predetermined message ("Yes"), the process can proceed to step 142 in which the user 30 selects the message at the device 28 for the base station 18 to play at the doorbell 14. However, if the user 30 decides not to send a predetermined message ("No"), the process can bypass step 142 and proceed to decision step 144 for ending the call at any time. If the user 30 does not end the call ("No"), the process can return to step 138, continuing to receive at the device 28 the synchronized media stream from the base station 18, in a loop. In other words, the SIP session stays active until the user 30 ends the call via the device 28. In addition, during the call, the user 30 can continue to send messages to be played at the doorbell 14. Also, at any time during the call, the user 30 can unmute the microphone of the device 28 and start talking to the visitor, with an exchange of bi-directional media streams between the base station 18 and the device 28. However, if the user 30 does end the call ("Yes"), the process can return to the process 100 of FIG. 3 ("Call End"), returning to decision steps 102 and 104, monitoring for another trigger event.

Figure 5:
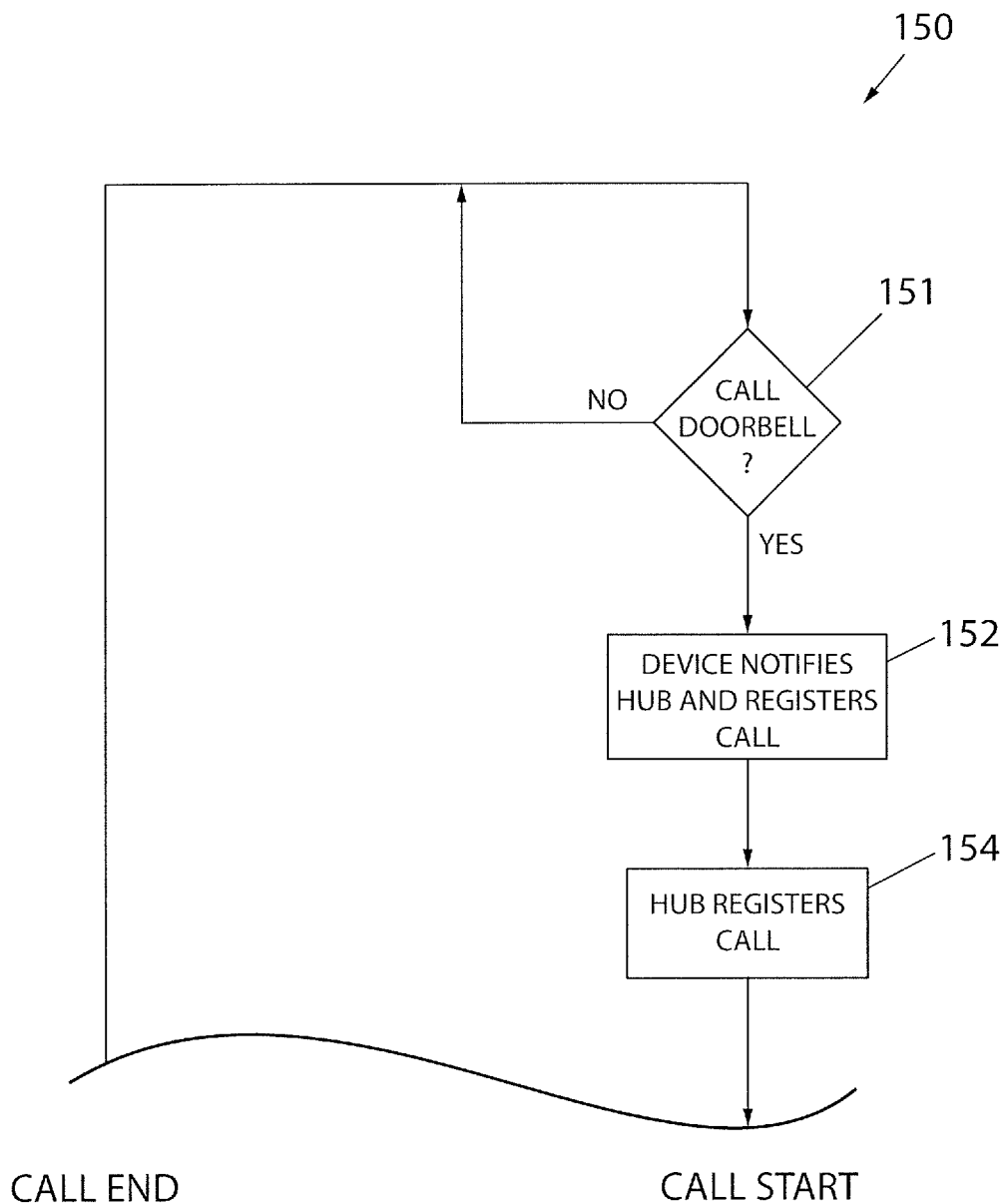
FIG. 5 is a flow chart illustrating operation for an electronic device making a call in the system of FIG. 1.

With additional reference FIGS. 2 and 5, in another aspect of the invention, the user 30 can control the device 28 to make a VoIP telephone call without waiting for a trigger event. Beginning at decision step 151, the user 30 can choose whether to call the doorbell 14 from the device 28. If the user 30 chooses not to call the doorbell 14 ("No"), the process 150 goes no further. However, if the user 30 does choose to call the doorbell 14 ("Yes"), the process 150 can proceed to step 152 in which the device 28 can register itself for a VoIP call and notify the base station 18. In particular, the device 28 can register for the call by contacting the call registration service 74 of the backend system 24. Also, the device 28 can notify the base station 18 to receive the call by contacting the system events service 70 of the backend system 24 which, in turn, contacts the event handler 58. At step 154, the base station 18 can register for the call by the event handler 58 contacting the call registration service 74. With the call registered at each endpoint, the call manager 82 of the device 28 can send a call invitation to the base station 18 through the signaling service 76. The call manager 64 of the base station 18, in turn, can receive the invite and automatically accept the call. With additional reference to FIG. 4, with the VoIP call connected, the process 150 can proceed to the telephone call routine ("Call Start") at process 130 as described above.

Figure 6:
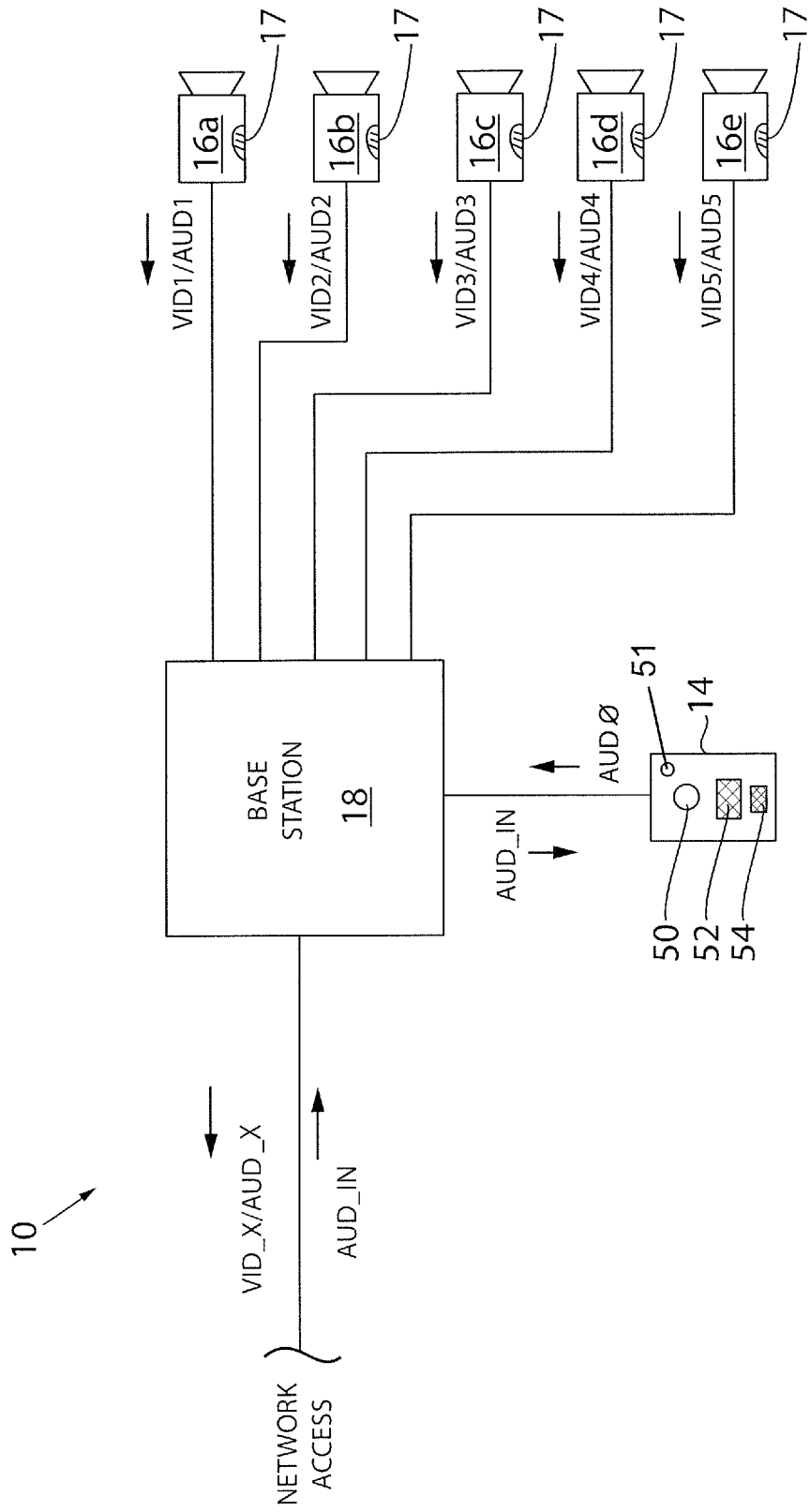
FIG. 6 is a diagram illustrating an exemplar system having a doorbell and multiple cameras in which audio captured by the doorbell and video captured by one of the cameras are communicated as a synchronized media stream in accordance with an aspect of the invention.

Referring now to FIG. 6, a diagram illustrating an exemplary system 10 having a doorbell 14, multiple cameras 16, such as five cameras labeled 16a-f, and a base station 18, is provided in accordance with an aspect of the invention. The doorbell 14 and the cameras 16a-16 can each be connected to the base station 18 through a single wireless LAN. The doorbell 14 can be configured to capture an audio stream ("AUD0"), such as through the microphone 52, for sending to the device 28 when a visitor 40 triggers the doorbell. The doorbell 14 can also be configured to play an audio stream ("AUD_IN"), such as from the device 28, enabling bi-directional, real-time communication with the visitor 40 during a VoIP call. In addition, each camera 16 can be configured to capture a video stream ("VIDx") and an audio stream ("AUDx"), such as the first camera 16a capturing a first video stream ("VID1") and a first audio stream ("AUD1"), the second camera 16b capturing a second video stream ("VID2") and a second audio stream ("AUD2"), and so forth. The base station 18 can execute a program stored in a non-transient medium to select a given one of cameras 16a-16e from among the multiple cameras for capturing a video stream ("VID") from the given (selected) camera to synchronize such video stream from the camera ("VID_X") with an audio stream ("AUD_X") from the doorbell 14 ("AUD0") or a given camera 16a-16e ("AUD1"-"AUD5") to produce a synchronized media stream ("VID_X"/ "AUD_X").

The synchronized media stream can be sent to and played by the device 28, thereby appearing to the user 30 of the device 28 like a traditional video conference call. The device 28 can return audio to the doorbell 14 in the form of audio stream ("AUD_IN"). As a result, the system 10 can allow simultaneous video and audio communication to a user 30 on the device 28, in which the video is provided by a specific camera 16 that is selected from among the multiple cameras 16 provided at different locations, while audio can be provided by the device 28 back to the doorbell 14, during a telephone call.

Figure 7:
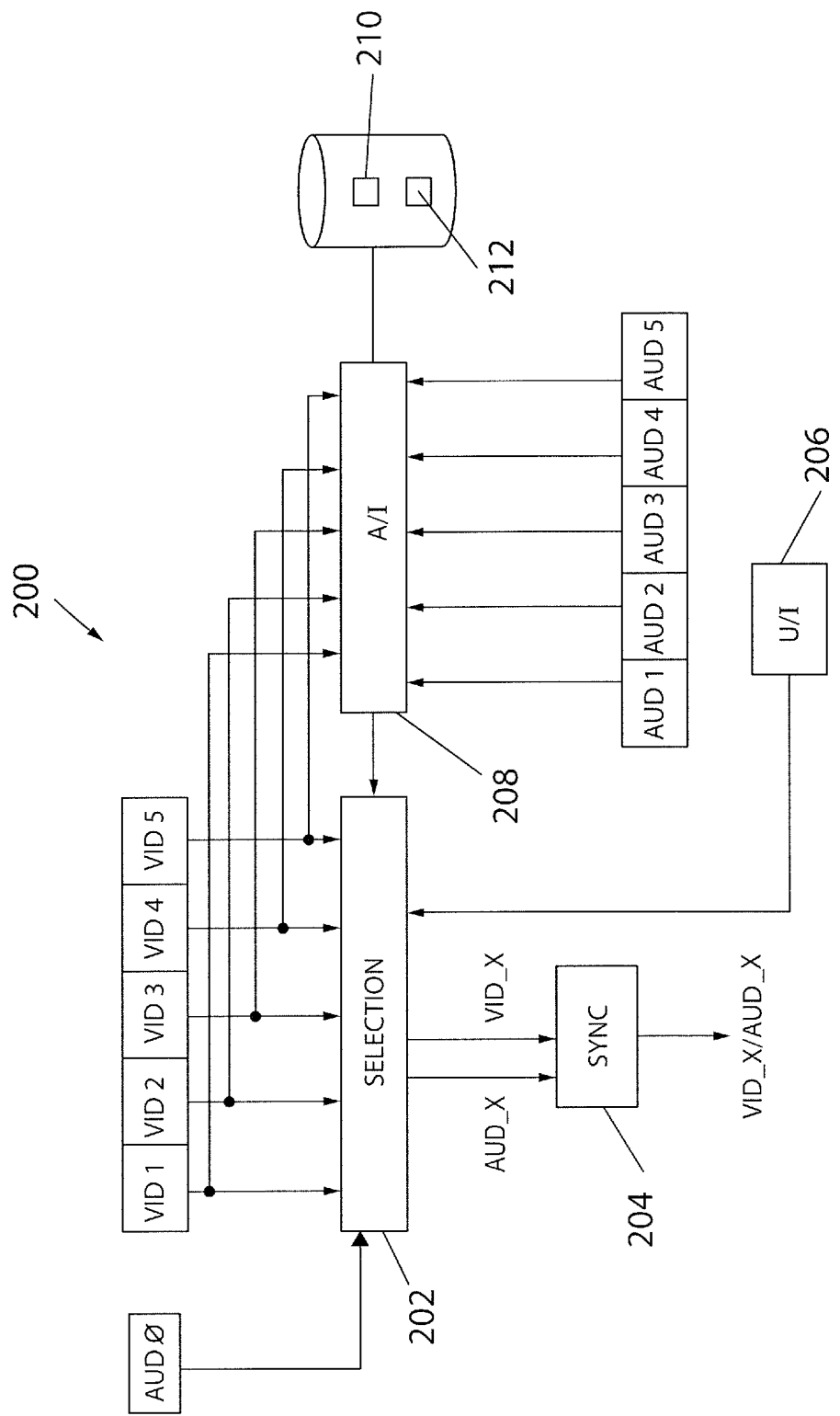
FIG. 7 is a diagram illustrating selection of a camera, for capturing video for the synchronized media, provided by selection logic in accordance with an aspect of the invention.

Referring now to FIG. 7, a diagram illustrating a system 200 for selection of a camera 16, for capturing the video stream ("VIDX") for the synchronized media stream to the device 28, is provided in accordance with an aspect of the invention. Various aspects of the system 200 could be implemented, for example, by the base station 18 in hardware, software and/or firmware. In the system 200, a selection engine 202 can select a camera 16 for providing a captured video stream from the camera to a synchronization engine 204. For example. The selection engine 202 could select the third camera 16c for providing a captured video stream ("VID3") from the third camera as the video stream ("VIDX") being to the synchronization engine 204. The synchronization engine 204, in turn, can synchronize the selected video stream ("VIDX") with the audio stream from the doorbell 14 ("AUD0"), such as based on timestamps of corresponding packets, to produce the synchronized media stream ("VID_X"/"AUD0").

Figure 8:
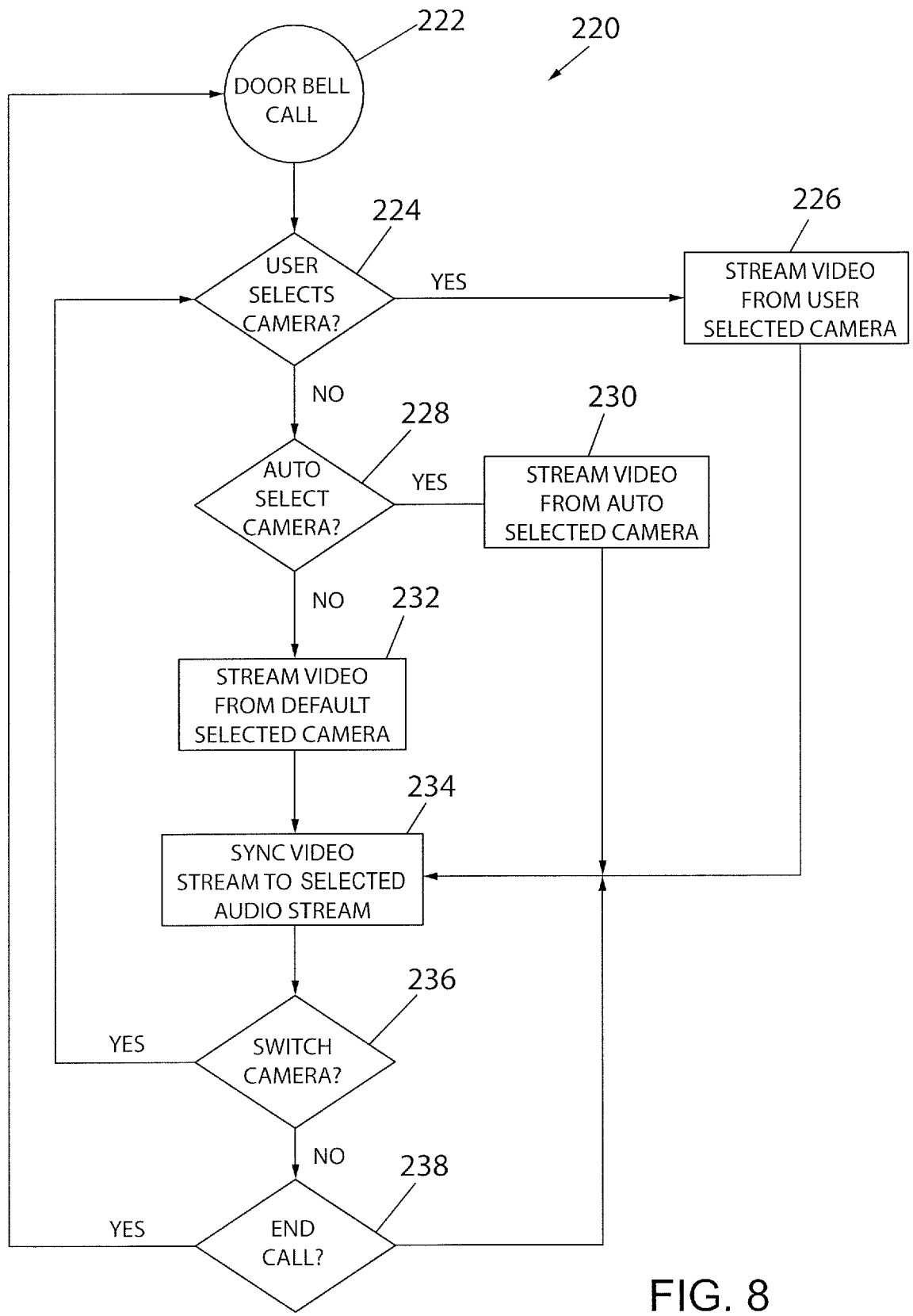
FIG. 8 is a flow chart illustrating selection of a camera for capturing video for the synchronized media stream of FIG. 6 in accordance with an aspect of the invention.

The selection engine 202 can receive input for selecting one of the available cameras 16. Such input can allow selection of a camera 16 by default, based on user input, and/or automatically using artificial intelligence. In one aspect, with additional reference to FIG. 8, a flow chart illustrating a process 220 for selection of a camera 16 for capturing video for the synchronized media stream is provided. The process begins at step 222 with a doorbell trigger event. Such an event could comprise, for example, a visitor 40 pressing the button 50 of the doorbell 14, motion and/or sound of the visitor 40 being detected by the doorbell 14, and/or the user 30 calling the doorbell 14, including as described above with respect to FIGS. 3-5. Next, at decision step 224, the system can determine whether user input is received for selecting a given camera 16. Such user input may override selection by any other technique. The user input can be provided in various ways, such by the user 30 through accessing a touchscreen on the device 28, through accessing a touchscreen, mouse, or keypad of the computer 44, etc.

Figure 9:
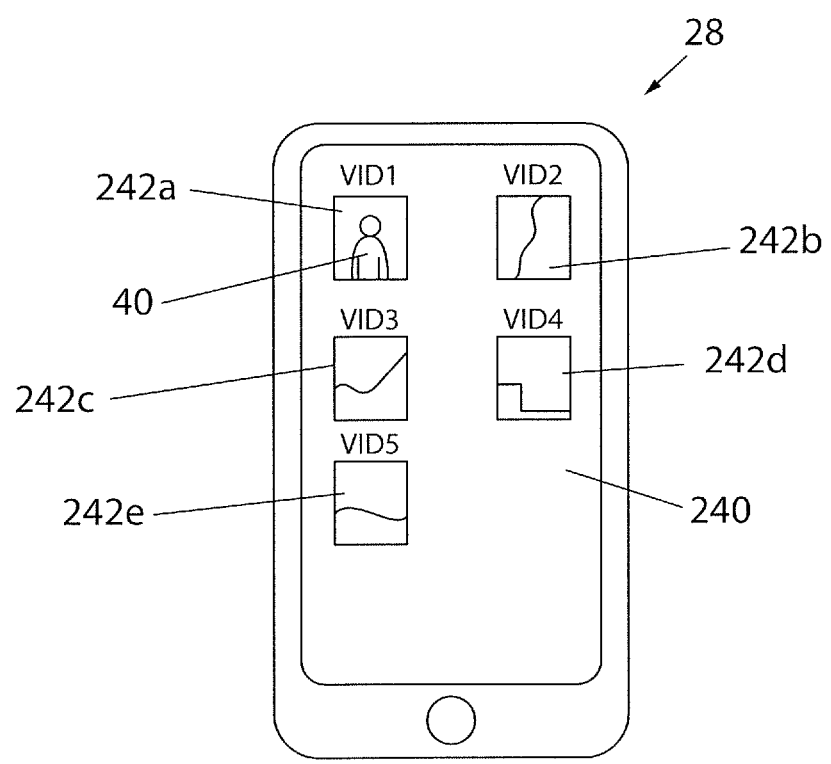
FIG. 9 is a diagram illustrating an exemplary computing device in which a camera of FIG. 6 for capturing video for the synchronized media stream can be selected based on user input.

For example, with additional reference to FIG. 9, in one aspect, the user 30 can provide user input for selecting a given camera 16 through a Graphical User Interface (GUI) 240 implemented by an application program executing on the device 28. The GUI 240 could provide multiple thumbnails 242, such as five thumbnails labeled 242a-f, each corresponding to an image, video and/or audio captured by a corresponding one of the cameras 16a-f, respectively. The user 30 can select a given thumbnail 242 to thereby select the camera associated with that thumbnail 242. For example, the user 30 may select the thumbnail 242a upon recognizing an image of the visitor 40 in the thumbnail 242a to thereby select the corresponding camera 16a.

In another aspect, the user 30 could provide user input by other means, such as selecting a given camera 16 from a dropdown menu of the GUI 240. Such variations are within the scope of the invention.

Referring back to FIG. 7, such user input can be processed by user input logic 206 providing feedback to the selection engine 202. Referring again to FIG. 8, if the system determines that user input is received for selecting a specific camera such as camera 16a ("Yes"), the process 220 can proceed to step 226 in which the selection engine 202 receives the input logic 206 to select the specified camera for sending the corresponding video stream ("VID_X") of the selected camera to the synchronization engine 204. However, if the system determines that user input is not received ("No"), the process 220 can proceed to decision step 228.

At decision step 228, when enabled by the user 30, the system can determine whether to automatically select a given camera 16. Referring back to FIG. 7, in one aspect, the system can implement an artificial intelligence system 208 to automatically select the given camera 16. The artificial intelligence system 208 could comprise, for example, a neural network which can be trained to make desirable selections with improved accuracy over time. In one aspect, the artificial intelligence system 208 could be configured to select a camera 16 according to any motion or sound being detected by the camera 16, such as by an imager, motion sensor and/or microphone 17 of the camera 16. In another aspect, the artificial intelligence system 208 could be configured to select a camera 16 according to an image captured by the camera 16 by using pattern recognition to match the received image with one or more predetermined images 210 stored in a non-transient medium. For example, the third camera 16c could be selected according to an image captured by such camera matching a predetermined image of a person. The predetermined image could be captured by the system itself or could be provided to the system from an external source. In yet another aspect, the artificial intelligence system 208 could be configured to select a camera according to a sound captured by the camera 16 matching one or more predetermined sounds 212 stored in the non-transient medium. For example, the fourth camera 16d could be selected according to a sound captured by a microphone 17 of such camera matching a predetermined sound of glass breaking.

Referring again to FIG. 8, if the system is enabled to automatically select a camera 16 ("Yes"), the process 220 can proceed to step 230 in which the selection engine 202 receives input from the artificial intelligence system 208 to select the camera 16 for sending the corresponding video stream ("VID_X") of the selected camera 16 to the synchronization engine 204. However, if the system is not enabled to make an automatic selection ("No"), such as upon being disabled, the process 220 can proceed to decision step 232 to select a default camera. The default camera could be, for example, the first camera 16a, which could be arranged against the exterior wall of the building 32, several feet above the door 34, to provide an optimum angle for viewing the visitor 40 standing in front of the door 34. The default camera could be preconfigured by the user 30 during system setup.

Next, at step 234, now receiving the video stream ("VID_X") from the selected camera 16, the synchronization engine 204 can proceed to synchronize packets of the selected video stream ("VID_X") with matching packets of the audio stream from a selected source, such as the doorbell 14 ("AUD0") or a given camera 16a-16e with a microphone ("AUD1"-"AUD5"), which synchronization can be based on corresponding timestamps, as a synchronized media stream ("VID_X"/"AUD0"). In one aspect, audio can be streamed from the microphone of another camera in the system, while audio from the doorbell 14 is recorded to be played back later or immediately after the audio from camera is stopped. Then, the synchronized media stream can be sent to the device 28, such as during a Voice over Internet Protocol (VoIP) call.

Next, at decision step 236, the system can determine whether an event requiring dynamic selection of a different camera 16 has occurred during the same doorbell event or call. Such an event could comprise, for example, receiving a new or updated user selection from the user input logic 206, detecting a new or updated event from the artificial intelligence system 208, and the like. For example, user input or a default selection may have been used to initially select the first camera 16a for viewing the visitor 40. However, during the event or call, the artificial intelligence system 208 might have detected the sound of breaking glass at the fifth camera 16e. Upon such occurrence, the system can dynamically switch from the first camera 16a to the fifth camera 16e for providing the selected video stream ("VID_X"). This allows the synchronized media stream to be updated to synchronize a new video stream, from a newly selected camera 16, with the audio stream from the doorbell 14. This can appear to the user 30 of the device 28 like a continuous video conference call in which the video suddenly changes. The system can also be configured to select camera 16a-e in a round-robin way so that the user 30 is able to see video from each camera 16 in the system for a configurable time, such as a few seconds, during an ongoing doorbell call.

If the system determines that an event requiring dynamic selection of a different camera 16 has occurred ("Yes"), the process 220 can proceed to allow such selection of a different camera 16, such as by repeating the decision steps 224 and 228. However, if the system determines that an event requiring dynamic selection of a different camera 16 has not occurred ("No"), the process 220 can proceed to decision step 238 to determine whether the event or call has ended, such as by checking whether motion is still detected by the doorbell 14. If the event or call has not yet ended ("No"), the process 220 can return to step 234 to continue synchronizing packets and sending the synchronized media stream. However, if the event or call has ended ("Yes"), the process 220 can return to step 222 to await a next doorbell trigger event.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

It should be appreciated that such a development effort might be complex and time consuming, but would nevertheless be a routine undertaking of design, fabrication, and manufacture for those of ordinary skill having the benefit of this disclosure. Nothing in this application is considered critical or essential to the present invention unless explicitly indicated as being "critical" or "essential."

What is claimed is:

1. An electronic doorbell system, comprising:
   an electronic doorbell including a first microphone configured to capture an audio stream;
   a plurality of cameras, each camera being configured to capture a video stream and including a second microphone configured to capture an audio stream; and
   a hub in wireless communication with the electronic doorbell and the plurality of cameras, the hub having a processor executing a program stored in a non-transient medium and being operable to:
   capture an audio stream from the first microphone on the electronic doorbell or from the second microphone on a camera selected from the plurality of cameras;
   receive user input from an electronic device or input from an artificial intelligence system to select a camera from the plurality of cameras for capturing a video stream;
   synchronize the video stream from the selected camera with the audio stream from the first or second microphone to produce a synchronized media stream, wherein the camera selected to provide the video stream is different than the camera from which the second microphone is selected; and
   send the synchronized media stream to the electronic device.

2. The system of claim 1, wherein the processor executes to receive user input, wherein the camera is selected according to the user input.

3. The system of claim 1, wherein the processor executes to automatically select the camera without user input.

4. The system of claim 1, wherein the hub executes the artificial intelligence system to automatically select the camera.

5. The system of claim 4, wherein the artificial intelligence system comprises a neural network.

6. The system of claim 4, wherein the artificial intelligence system is configured to select a camera according to a motion and/or sound detected by the camera.

7. The system of claim 4, wherein the artificial intelligence system is configured to select a camera according to an image captured by the camera matching a captured image to a predetermined image.

8. The system of claim 4, wherein the artificial intelligence system is configured to select a camera according to a sound matching a detected sound to a predetermined sound.

9. The system of claim 1, wherein the selected camera is a first camera capturing a first video stream, and wherein the processor is further configured to receive user input or input from the artificial intelligence system to select a second camera from the plurality of cameras for capturing a second video stream, and wherein the synchronized media stream is updated to synchronize the second video stream from the second camera, instead of the first video stream from the first camera, with the audio stream from the electronic doorbell.

10. The system of claim 1, wherein the processor is further configured to execute to send the synchronized media stream during a Voice over Internet Protocol (VoIP) telephone call.

11. The system of claim 1, wherein the electronic doorbell further comprises a speaker and a built-in camera, wherein the audio stream is captured by the first microphone, and wherein the electronic doorbell is in communication with the hub through a Local Area Network (LAN).

12. The system of claim 11, wherein the plurality of cameras comprises at least five video cameras, each video camera being in communication with the hub through the LAN.

13. The system of claim 11, wherein the electronic doorbell is contained in a doorbell housing configured to be arranged at a first location proximal to a door, and wherein each camera is contained in a camera housing configured to be arranged at locations distal to the first location.

14. A method for electronic monitoring, comprising:
   configuring an electronic doorbell to capture a first video stream and a first audio stream from a first microphone;
   configuring a plurality of cameras to each capture a second video stream and to each capture a second audio stream from a second microphone;
   capturing a selected audio stream from the first microphone on the electronic doorbell or from the second microphone on a camera selected from the plurality of cameras;
   receiving user input from an electronic device or input from an artificial intelligence system to select a camera from the plurality of cameras for capturing a selected video stream;
   synchronizing the selected video stream from the selected camera with the selected audio stream from the first or second microphone to produce a synchronized media stream, wherein the camera providing the selected video stream is different than the camera from which the second microphone is selected; and
   sending the synchronized media stream to the electronic device.

15. The method of claim 14, further comprising receiving user input and selecting the camera according to the user input.

16. The method of claim 14, further comprising using the artificial intelligence system to automatically select the camera without user input.

17. The method of claim 16, further comprising selecting the camera according to an image captured by the camera matching a predetermined image.

18. The method of claim 16, further comprising selecting the camera according to a sound captured by the camera matching a predetermined sound.

19. The method of claim 14, wherein the selected camera is a first camera capturing a first camera video stream, and further comprising receiving user input or input from the artificial intelligence system to select a second camera from the plurality of cameras for capturing a second camera video stream, and updating the synchronized media stream to synchronize the second camera video stream from the second camera, instead of the first camera video stream from the first camera, with the first audio stream from the electronic doorbell.

20. The method of claim 14, further comprising sending the synchronized media stream during a VoIP telephone call.

* * * * *